Oct. 23, 1923.

Re. 15,702

C. C. HARRIS

STAMP PAD BOX

Original Filed March 22. 1922

Inventor

Carl C. Harris.

By Southgate & Southgate.

Attorneys

Reissued Oct. 23, 1923. Re. 15,702

UNITED STATES PATENT OFFICE.

CARL C. HARRIS, OF ORANGE, MASSACHUSETTS, ASSIGNOR TO RIVET-O MANUFACTURING COMPANY, A CORPORATION OF MASSACHUSETTS.

STAMP-PAD BOX.

Original No. 1,448,213, dated March 13, 1923, Serial No. 545,830, filed March 22, 1922. Application for reissue filed June 18, 1923. Serial No. 646,111.

*To all whom it may concern:*

Be it known that I, CARL C. HARRIS, a citizen of the United States, residing at Orange, county of Franklin, State of Massachusetts, have invented a new and useful Stamp-Pad Box, of which the following is a specification.

This invention relates to a stamp pad box for use in inking rubber stamps and the like. The principal objects of the invention are to provide a device of this character which will be durable; which will not scratch a desk or table on which it is used, and which will be entirely noiseless and will have a neat appearance even after it has been used for a long time; also to provide a construction in which the base block that insures certain of the above named advantages is so covered as to avoid the projection of metallic edges and will also constitute a flat surface against which the lower edge of the cover will rest when the box is closed; to provide a non-collapsible top that will not jam down over the sides of the pad even with the roughest usage; to provide an improved way of covering and concealing the internal support and providing a neat metallic covering; and to provide improved means for securing the hinges of the cover to the base block.

Further objects and advantages of the invention will appear hereinafter.

Reference is to be had to the accompanying drawings, in which.

Figure 1:
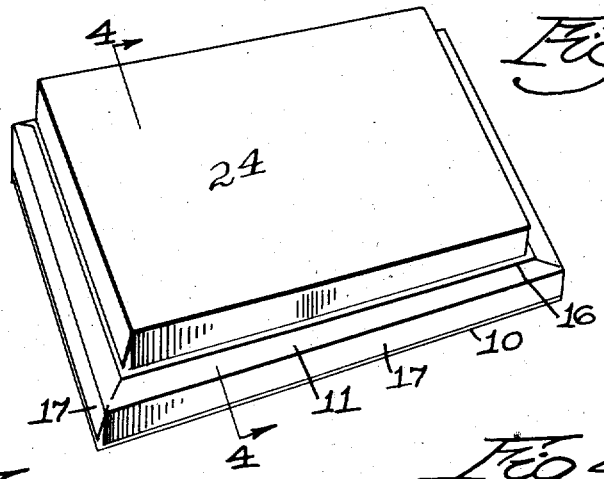
Fig. 1 is a perspective view of a stamp pad box and cover constructed in accordance with this invention and shown closed.
Figure 2:
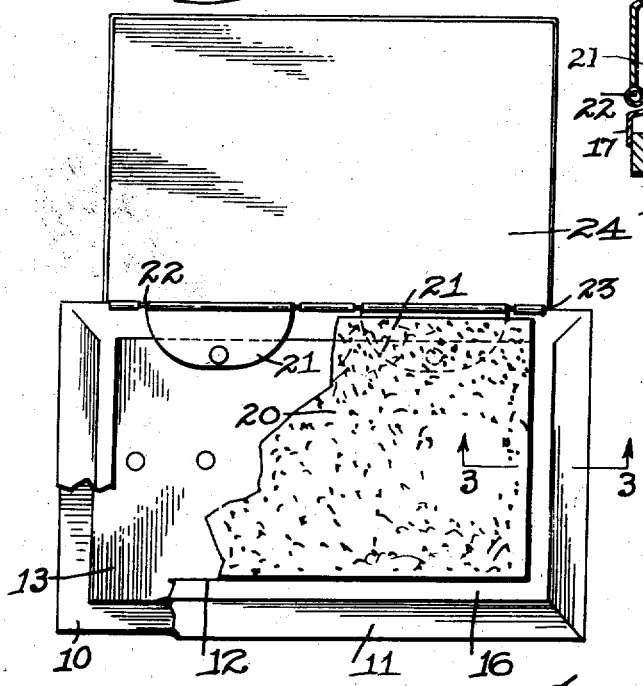
Fig. 2 is a plan of the same with part of the pad broken away to show the connection of the cover and illustrating the cover thrown back into wide open position.
Figure 4:
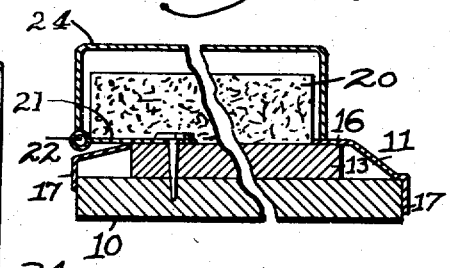
Fig. 4 is a transverse sectional view showing the box closed, and taken on the line 4—4 of Fig. 1.
Figure 3:
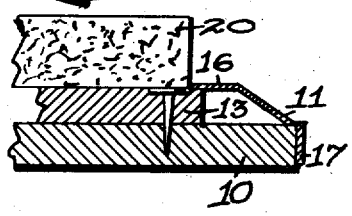
Fig 3 is a longitudinal sectional view showing the pad in use and taken on the line 3—3 of Fig. 2.

An important feature of the invention consists in the use of a base 10 formed of wood fiber board cut to the proper shape. On this case is fixed a plate 13 also of fiber board of the same shape as the base but smaller each way. These two pieces of fiber board are firmly fixed together. Over this is a covering 11 of sheet metal, celluloid, or the like which is formed with a top which is pressed out to a rectangular shape and has its central portion 16 raised into a higher plane and is provided with a central opening 12 of the same general shape as the fiber board base. The opening 12 is smaller in each dimension than the plate 13 so that the latter affords a firm foundation for the flat upper part 16 of the covering 11. The upper plate 13 fills the opening in the covering 11 and constitutes a surface to which the inking pad 20 can be glued or otherwise secured.

The inking pad consists of a piece of sponge rubber split in two so as to provide an upper surface of split sponge rubber and a bottom skin surface which is comparatively free from even minute openings and is capable of being cemented or glued to the plate 13 which constitutes part of the base. It projects over the edges of the opening 12 all around and conceals those edges from view. The covering 11 is held in position on the base by flanges 17 which extend down at right angles to the plane of the top thereof and fit frictionally against the sides and ends of the base 10.

Lying over the covering 11 at the back thereof and projecting beyond the rear edge of the opening are a pair of sheet metal hinge members 21. These are nailed, screwed, riveted or otherwise secured to the upper plate of the base and project horizontally under the inking pad to the extreme rear edge of the whole device where they are turned up to form cylindrical passages for a hinge pin 22. This hinge pin also passes through cylindrical openings 23 in the bottom edge of a sheet metal cover 24. This cover is larger than the inking pad and in use its side and end flanges rest on the upper horizontal surface 16 of the covering 11. There is no chance for these flanges of this cover pressing out over the box or getting out of shape in use. It is for this reason that I call it a non-collapsible top.

On account of the material of which the base is made the device is incapable of scratching a desk on which it is used and it is noiseless in use as it has no metal parts adapted to come into contact with the surface on which it is supported. The sponge rubber pad and the upper wood fiber plate are cemented directly together and one of these two elements comes on either side of the metal or celluloid covering 11 so as to hold the latter firmly in position. On account of the direct binding between the sponge rubber and the upper base plate there will be no noise when the device is used for inking purposes because the rubber pad itself is supported firmly and without possibility of movement from the supporting base. This is an important feature because in the ordinary tin box pads a bulging of the sides of the tin is noticeable when the rubber stamp is pressed against the pad. This is due to the air pocket or space which develops a noise when the pad is hit with the rubber stamp.

The way of securing the hinged cover to the base board is important because it will be seen that all parts, that is, the cover, the rubber pad and the cover 11, are directly carried by one element, the base plate 13. The ledge 16 around the rubber pad is supported firmly below and receives the lower edge of the cover when closed. As this is a horizontal surface it will not cause the edges of the cover, consisting of four downwardly extending flanges to diverge from each other when the cover is accidentally pressed down too hard. Furthermore, there is no chance of these flanges engaging any vertical surface and sticking or binding as is common with the ordinary tin boxes on the market.

On account of the use of the sponge rubber for the pad it is not necessary to close the box absolutely tightly as has been the case with the ordinary rubber pads. This is due to the fact that in comparative tests, the ordinary rubber stamp pad has had a life of about fifty thousand impressions while a porous rubber pad of this kind will stand over a million and a half impressions without showing any serious signs of wear. The device is not seriously effected by dust in any form and there is no danger of the ink coming out because the rubber pad itself immediately draws back any that comes to the surface when the pressure of the rubber stamp is removed from it.

Although I have illustrated and described only one form of the invention I am aware of the fact that modifications can be made therein by any person skilled in the art without departing from the scope of the invention as expressed in the claims. Therefore I do not wish to be limited to all the details of construction herein shown and described but what I do claim is:—

1. As an article of manufacture, a stamp pad box comprising a base of wood fiber, a covering over the edges and around the perimeter of the top therof and having an opening therethrough, and a stamp pad in one piece firmly secured through said opening to the fiber board base and projecting over the edges of said opening to conceal the same.

2. As an article of manufacture, a stamp pad box comprising a base of wood fiber board, a sheet metal covering over the top thereof having flanges extending around the sides and ends of the base but of less width than the depth of the base to prevent their contact with a supporting surface, and having an opening therethrough, and a stamp pad secured through said opening to the fiber board base.

3. As an article of manufacture, a stamp pad box comprising a non-metallic base having a central portion projecting above the main portion and spaced equally around the edges thereof, a covering of sheet material around the edges of both portions and having an opening therethrough, and a pad of sponge rubber secured to the upper portion of the base through said opening and projecting over the edges of the opening to conceal the same.

4. As an article of manufacture, a stamp pad box comprising a wood fiber board base having a central plate projecting above the main portion and spaced equally around the edges thereof, a covering of sheet material having a raised flat surface resting on the edges of said plate and having a rectangular slanting surface extending around the edges of both portions and having an opening through said raised surface and a pad of sponge rubber cemented to the upper portion of the base through said opening.

5. As an article of manufacture, a stamp pad box comprising a non-metallic base, a covering of sheet material around the edges thereof and having an opening therethrough, a pad of sponge rubber secured to the top of the base through said opening and projecting over the edges of the opening to conceal the same, hinge pieces of sheet material secured to the base and extending over the covering at the rear thereof, and a cover of sheet material hinged to said hinge pieces and adapted to rest on the horizontal upper surface of said covering.

6. In a stamp pad box, the combination with a fiber board base having a central portion projecting above the main portion and spaced equally around the edges thereof, a covering of sheet material around the edges of both portions and having an opening therethrough, a pad of sponge rubber secured to the upper portion of the base through said opening, hinge pieces of sheet material secured to the fiber board base and projecting over the cover at the rear thereof, and a cover of sheet material hinged to said hinge pieces and adapted to rest on the horizontal upper surface of said covering.

7. In a stamp pad box, the combination with a base having a central portion projecting above the main portion and spaced around the edges thereof, a covering of sheet material around the edges of both portions, a pad of sponge rubber over said central portion, hinge pieces of sheet material secured to the base and projecting over the covering at the rear thereof, and a cover of sheet material hinged to said hinge pieces and adapted to rest on the horizontal upper surface of said covering.

8. As an article of manufacture, a stamp pad box comprising a base having a central plate projecting above the main portion and spaced around the edges thereof, a covering of sheet material having a raised flat surface resting on the edges of said plate and having a rectangular slanting surface extending around the edges of both portions and a pad of sponge rubber secured to the upper portion of the base.

In testimony whereof I have hereunto affixed my signature.

CARL C. HARRIS.